US010730808B2

(12) United States Patent
Lyu et al.

(10) Patent No.: US 10,730,808 B2
(45) Date of Patent: Aug. 4, 2020

(54) SELF-DEODORIZING COMPOSTING SYSTEM

(71) Applicant: TONGJI UNIVERSITY, Shanghai (CN)

(72) Inventors: Fan Lyu, Shanghai (CN); Pinjing He, Shanghai (CN); Liming Shao, Shanghai (CN); Hua Zhang, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 421 days.

(21) Appl. No.: 15/639,920

(22) Filed: Jun. 30, 2017

(65) Prior Publication Data
US 2017/0297969 A1 Oct. 19, 2017

Related U.S. Application Data

(63) Continuation of application No. PCT/CN2016/107625, filed on Nov. 29, 2016.

(30) Foreign Application Priority Data

Apr. 18, 2016 (CN) .......................... 2016 1 0240299

(51) Int. Cl.
*C05F 17/979* (2020.01)
*C05F 17/964* (2020.01)
(Continued)

(52) U.S. Cl.
CPC .......... *C05F 17/979* (2020.01); *C05F 17/964* (2020.01); *C05F 17/986* (2020.01); *C05F 17/993* (2020.01)

(58) Field of Classification Search
CPC .............. C05F 17/0205; C05F 17/0211; C05F 17/0229; C05F 17/0258; C05F 17/027; C05F 17/0276; C05F 17/0282
See application file for complete search history.

(56) References Cited

U.S. PATENT DOCUMENTS 3,895,916 A * 7/1975 Rosner .................... C05F 17/02
422/242
2002/0019045 A1 2/2002 Bisbis
2006/0148071 A1* 7/2006 Bauer ................. C05F 17/0258
435/290.1

FOREIGN PATENT DOCUMENTS

CN 1714213 12/2005
CN 1280240 10/2006
(Continued)

OTHER PUBLICATIONS

Kasinski et al,; ScienceDirect, Waste Management, "Municipal waste stabilization in a reactor with an integrated active and passive aeration system", vol. 50, Apr. 2016, pp. 31-38, 8 pages provided.
(Continued)

*Primary Examiner* — William H. Beisner
(74) *Attorney, Agent, or Firm* — Hamre, Schumann, Mueller & Larson, P.C.

(57) ABSTRACT

The present invention relates to a self-deodorizing composting system, comprising an outer membrane, an inner membrane, an air-ribbed cage and a deodorizing base, wherein two deodorizing bases are provided; the outer membrane and the inner membrane are held by the air-ribbed cage, with both ends of the outer membrane and the inner membrane respectively fixed to the two deodorizing bases, whereby a closed space is formed between the outer membrane and the inner membrane; the inner side of the inner membrane is used for placing the composting piles, with the malodor and water vapor generated from the composting piles entering into the closed space formed between the outer membrane and the inner membrane through the inner membrane, so that the water vapor is condensed into the water in the closed space, and the malodor molecules are absorbed and dissolved into the condensed water, thus forming the waste water which falls along the inner side of the outer membrane
(Continued)

and the outer side of the inner membrane to the bottom of the deodorizing bases and is discharged from the deodorizing base. Comparing with the prior art, the system in the present invention has a simple and detachable structure, and can isolate and remove the malodor and the water vapor generated when the biomass waste is composted.

11 Claims, 4 Drawing Sheets

(51) Int. Cl.
*C05F 17/986* (2020.01)
*C05F 17/993* (2020.01)

(56) References Cited

FOREIGN PATENT DOCUMENTS

| | | |
|---|---|---|
| CN | 102718581 | 10/2012 |
| CN | 105084966 | 11/2015 |
| CN | 105084967 | 11/2015 |
| CN | 105198517 | 12/2015 |
| CN | 105884432 | 8/2016 |
| DE | 4231414 | 3/1994 |
| EP | 1146027 | 10/2001 |
| KR | 2012098411 A * | 9/2012 |

OTHER PUBLICATIONS

ASTM International, E 398-03, "Standard Test Method for Water Vapor Transmission Rate of Sheet Materials Using Dynamic Relative Humidity Measurement", published Jul. 2003, pp. 1-4, 4 pages provided.

British Standard, BS EN ISO 9237: 1995, "Textiles-Determination of the permeability of fabrics to air", ISBN 0580247422, Jun. 1995, 16 pages provided.

* cited by examiner

SELF-DEODORIZING COMPOSTING SYSTEM

BACKGROUND OF THE INVENTION

Technical Field

The present invention relates to a self-deodorizing composting system, which belongs to the field of environmental protection and comprehensive utilization of resources.

Description of Related Art

As a biological treatment technology, composting is widely used in the treatment of food waste, household garbage, sludge, manure, straw and other biomass waste, that is, the use of aerobic microbial metabolism can realize the degradation and stability of biomass waste, making the waste no longer perishable and smelly. Meanwhile, its product compost becomes a process of the soil conditioning agent compatible with plant growth. Moisture and malodor controls are two key technologies of composting.

The pores of composted pile must maintain a certain space to ensure smooth airflow and oxygenated state, so as to avoid the formation of an anaerobic area. Therefore, a conditioning agent often needs to be added to biomass which has a high moisture content so as to reduce the moisture content of the feeds, while high-intensity ventilation or turning is also needed in the process of composting so accelerate water loss in the form of water vapor. However, in the process of ventilation and turning, a large mass of malodor will be distributed with the water vapor; the malodor is mainly composed of volatile organic compounds (VOCs), ammonia and hydrogen sulfide.

To control the moisture and the malodor at the same time, the negative pressure forced ventilation+tail gas deodorization, or the way of turning in a closed space or positive pressure forced ventilation+gas collection in a space under negative pressure+tail gas deodorization can be applied. Such tail gas deodorization generally adopts physical, chemical or biofilter methods. The amount of tail gas must be greater than the ventilation to ensure the effective collection of the ventilated gas, so the treatment capacity of the exhaust gas is extremely huge, and a large area of tail gas treatment facilities and high operating costs are needed.

To alleviate the problem of malodor in outdoor composting, a flexible air-proof and water-proof covering material can be used on the compost to prevent the spread of malodor and ingress of rain. But at the time of ventilation or turning, the covering material needs to be uncovered, during which a large mass of malodor is difficult to be controlled. Also, when compost is covered, the water vapor in the compost cannot be discharged, so it will be condense inside the cover and drip back to the surface of the compost.

The above-mentioned covering material can be changed to a breathable but water-proof material so that the rainwater outside the covering material cannot enter but air and water vapor of the compost under forced ventilation can exit through the covering material. In addition, the covering material can also play a role of blocking part of the malodor such as VOCs, bacteria and aerosols by way of adsorption and filtration.

Examples of the covering materials that have been used in the composting system include: 1) GORE-TEX three-layer water-proof, air-proof and wind-resistant fabrics supplied by W.L. Gore & Associates, Inc., the core of which material is Expanded Polytetrafluoroethylene (ePTFE) sandwiched between two woven polyesters, which is capable of making the water vapor molecules with a molecular diameter of 0.324 nm passable while water droplets with a diameter of 1-2 mm cannot enter thanks to its hundreds of nanometers of microporous pores. Examples of applications include Slawomir Kasinski, Monika Slota, Michal Markowski, Anna Kaminska's "Municipal waste stabilization in a reactor with an integrated active and passive aeration system"; Waste Management, 2016, 50, 31-38. 2) The covering material adopted in Ploucquet CF Gmbh's German patent "Abdeckung aus Kunststoff für eine Kompostmiete (Plastic cover for a compost heap)", DE 4231414 is the microporous polyurethane (Polyurethane) or the microporous polyethylene (Polyethylene) sandwiched between two woven or unwoven materials, with an air flow of up to 1-15 L/(m$^2$·s) under a 10 mbar differential pressure. 3) Du Pont's patent "Composting treatment system", CN1280240, US20020019045 makes breathable but water-proof fabrics, such as DuPont Tyvek@1423A (an ultraviolet and heat stabilized flash spun polyethylene) powder layer which is laminated to the polypropylene-based webbing as a back-up layer, hot-laminated onto the high-density polyethylene grid (0.8 cm×0.8 cm of open pores), and then uses this composite laminate as the outer wall of the composting chamber. The advantage is that the covering layer is prevented from being in direct contact with the compost which facilitates the entry and exit of the facilities and materials, and the condensate formed on the inner side of the covering material can fall along the grid to the wall side so as not to directly drip on the compost.

The above-mentioned methods all adopt a layer of covering material (containing a multi-layer material), so the effect of the moisture and malodor synchronous control is not ideal: a large mass of water vapor evaporates in the process of forced ventilation while a large mass of malodor is also discharged. The air permeability of the covering material is high, that is, the effect of ventilation is good, which means that the pore size is large so that the malodor molecules, or even bacteria and aerosols, can easily pass through. A biofilm or fouling layer is gradually formed by the bacteria, aerosols and condensates which are blocked on the inner side of the covering material, so although the malodor molecules can be further removed, the pore size of the covering material will gradually shrink, resulting in lower ventilation and non-discharge of water vapor; the covering material directly over the compost is easily contaminated and may grow bacteria.

BRIEF SUMMARY OF THE INVENTION

The objective of the present invention is to provide a self-deodorizing composting system which overcomes the drawbacks in the prior art described above.

To achieve the objective, the present invention adopts the following technical solution:

a self-deodorizing composting system, comprising an outer membrane, an inner membrane, an air-ribbed cage and a deodorizing base, wherein two deodorizing bases are provided; the outer membrane and the inner membrane are held by the air-ribbed cage, with both ends of the outer membrane and the inner membrane respectively fixed to the two deodorizing bases, whereby a closed space is formed between the outer membrane and the inner membrane; the outer membrane using air-proof and water-proof fabrics is located on the outer side of the air-ribbed cage, while the inner membrane made of breathable but water-proof fabric is located on the inner side of the air-ribbed cage; the inner side of the inner membrane is used for placing the composting piles, with the malodor and water vapor generated from the composting piles passing through the inner membrane into the closed space between the outer membrane and the inner membrane, so that the water vapor is condensed into water in the closed space, and the malodor molecules are absorbed and dissolved into the condensed water, thus forming waste water which falls along the inner side of the outer membrane and the outer side of the inner membrane to the bottom of the deodorizing bases and is discharged from the deodorizing base.

The outer membrane made of air-proof and water-proof fabric faces toward the outer space, so that the water vapor, malodor and condensate, as well as rain, cannot penetrate. Preferably, durable, UV-resistant and oxidation-resistant material is used.

The inner membrane using the breathable but water-proof fabric faces toward the composting piles, so that the water vapor and malodor on the inner side can penetrate to the outer side while the condensate does not flow back to the inner side. Preferably, material with a water vapor penetrability of higher than 3,000 g/(m²·s) (measured at 23° C. according to ASTM E3983) is used, so that the water vapor can quickly leave the composting space to avoid condensation on the inner side of the inner membrane from where it may fall back on the compost. Preferably, antibacterial material is used to avoid the formation of biofilm and the blockage of membrane pores which would reduce air penetrability. Preferably, when the composting adopts the oxygen supply way of positive forced ventilation, material with an air penetration of higher than 15 L/(m²·s) (tested at 10 mbar according to ISO9237) is used, so that the tail gas can be discharged timely.

The deodorizing base is provided with the functions of fixation and sealing of the outer membrane and the inner membrane, as well as collection and treatment of waste water. The deodorizing base comprises a slotted frame, with the ends of the outer membrane and the inner membrane both fixed to the inner side of the slotted frame by means of a holder. A filler layer is laid on the upper layer in the slotted frame while a guide layer is laid on the lower layer. The waste water between the outer membrane and the inner membrane firstly flows into the filler layer, and then flows into and is discharged from the guide layer. The filler layer is used to adsorb, assimilate and degrade the malodor molecules dissolved in the condensed water; the filler layer is also used to degrade the malodor molecules by way of biological action when a biofilm is formed on the filler surface in the filler layer. The guide layer is used to collect and discharge the waste water.

The filler in the filler layer is selected from bio-carbon particles or activated carbon particles; the lower surface of the guide layer has a certain slope, and the guide layer is provided with permeable material such as gravel.

Furthermore, the aerobic bio-degradation efficiency of the malodor molecules in the filler layer can be enhanced by way of maintaining the oxygen content in the headspace of the filler layer at a higher level to ensure that the microorganisms in the filler layer are aerobic. Particularly, an oxygen sensor is positioned in the filler layer to monitor the oxygen content in the space between the outer membrane and the inner membrane, and the oxygen sensor data is transmitted to the oxygen controller through the oxygen detection signal line; the oxygen controller is connected to blower II through an electrically controlled line, wherein when the oxygen content is lower than a set value, the oxygen controller activates blower II through the electronically controlled line to supply oxygen to the filler layer.

Because the inner membrane has a certain air penetrability, the oxygen will spread to the composting space, thus making the composting space (i.e., above the composting surface) also have a high oxygen content, which is also conducive to the degradation of the malodor molecules in the composting space. Preferably, the oxygen content is controlled to 10% (v/v).

For the deodorizing base, a water vapor collecting pipe connected to the guide layer is also provided; the water vapor collecting pipe discharges the collected waste water and the tail gas directly, or is externally connected with a water vapor control system to improve the level of pollution control, so that the use of the water vapor control system enables the further treatment and purification of the collected waste water and tail gas. The water vapor collecting pipe discharges the waste water and the tail gas in the guide layer when the electronically controlled valve provided on the water vapor collecting pipe is opened, and encloses the waste water and the tail gas in the treatment system when the electronically controlled valve is closed, thus increasing the residence time of the malodor molecules during the period so as to improve the efficiency of malodor removal.

The air-ribbed cage supporting and separating the outer membrane and the inner membrane is composed of a plurality of independent inflatable columns, with each of the inflatable columns being bent and both ends of each inflatable column located above the two deodorizing bases.

Each of the inflatable columns are provided with separate inflatable pipes and air pressure sensors, wherein the inflatable pipe is separately provided with an electrically controlled valve, and all of the inflatable pipes are connected to blower I; the air pressure sensor is connected with the air pressure controller through the air pressure detection signal line, and the air pressure controller is respectively connected with each electrically controlled valve and blower I through electrically controlled lines; when the pressure of a certain inflatable column is reduced, the air pressure controller activates blower I and the electrically controlled valve for a separate air supply. The use of the independent inflatable columns can avoid the destruction of the overall structure caused by local leakage, make maintenance and overhaul easier and save the cost of blowing.

The inflatable columns are connected to the outer membrane and the inner membrane through a fixing ring for easy disassembly and assembly, and the outer membrane and the inner membrane can be independently removed and cleaned. The front and back of the composting space formed can be completed enclosed by the outer membrane, or a transparent window and large and small-sized door openings can be provided on the outer membrane for occasional entry and exit of facilities, materials and personnel.

Compared with the prior art, the self-deodorization and composting system in the present invention adopts a dual-layer membrane structure which helps realize the following functions:

1) the inner membrane using the breathable but water-proof fabric faces toward the composting piles, so that the water vapor and malodor on the inner side can penetrate to the outer side while the condensate does not flow back to the inner side; 2) the outer membrane using the air-proof and water-proof fabric faces toward the outer space, so that the water vapor, malodor and condensate, as well as rain, cannot penetrate; 3) the water vapor is condensed between the two layers of fabrics, and falls along the outer side of the inner membrane and the inner side of the outer membrane to bottom bases used for fixing the outer membrane and the inner membrane; 4) the malodor molecules are dissolved together with the water vapor into the condensed water; 5) the malodor molecules are removed when the condensate flows through the waste water treatment components; 6) the air-ribbed cage forms a movable three-dimensional space for easy disassembly as well as entry and exit of the facilities and materials; 7) the two layers of fabric can be independently removed and cleaned.

Figure 1:
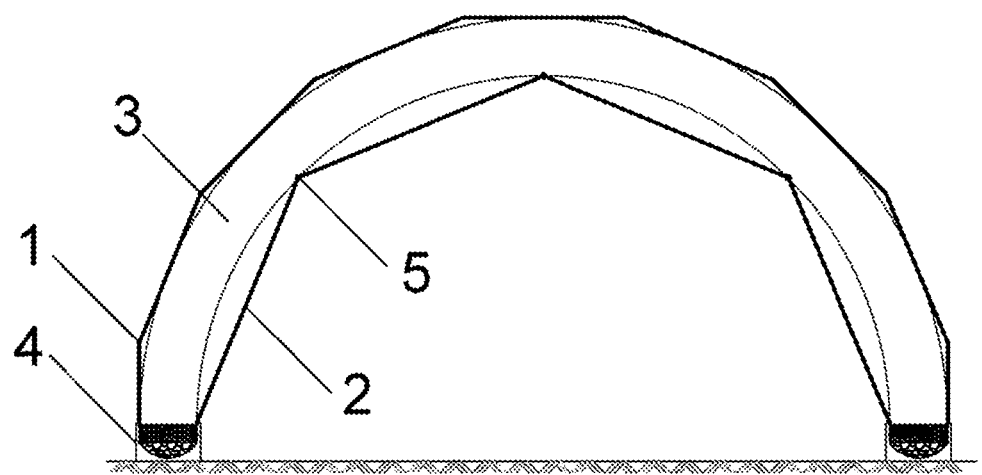
FIG. 1 is a vertical view of the assembled device in one preferred embodiment of the present invention.

The parts in the drawings are marked as below: 1—outer membrane; 2—inner membrane; 3—air-ribbed cage; 4—deodorizing base; 5—fixing ring; 6—slotted frame; 7—holder; 8—guide layer; 9—filler layer; 10—blower I; 11—air pressure controller; 12—electrically controlled valve; 13—air pressure sensor; 14—air pressure detection signal line; 15—electrically controlled line; 16—blower II; 17—water vapor control system; 18—oxygen controller; 19—oxygen sensor; 20—oxygen detection signal line; 21—assembled device; 22—composting pile; 23—blower III; 24—ventilating pipe; 25—turning machine; 26—water vapor collecting pipe.

DETAILED DESCRIPTION OF THE INVENTION

The present invention is further detailed in combination with the drawings and embodiments as follows.

Embodiment 1

A self-deodorizating composting system, as shown in FIG. 1, comprising an outer membrane 1, an inner membrane 2, an air-ribbed cage 3 and deodorizing bases 4, wherein two deodorizing bases 4 are provided; the outer membrane 1 and the inner membrane 2 are held by the air-ribbed cage 3, with both ends of the outer membrane 1 and the inner membrane 2 respectively fixed to the two deodorizing bases 4, whereby a closed space is formed between the outer membrane 1 and the inner membrane 2; the outer membrane 1 using air-proof and water-proof fabrics is located on the outer side of the air-ribbed cage 3, while the inner membrane 2 using ventilated but water-proof fabrics is located on the inner side of the air-ribbed cage 3; the inner side of the inner membrane 2 is used for placing the composting pile 22, with the malodor and water vapor generated from the composting pile 22 entering into the closed space formed between the outer membrane 1 and the inner membrane 2 through the inner membrane 2, so that the water vapor is condensed into the water in the closed space, and the malodor molecules are absorbed and dissolved into the condensed water, thus forming the waste water which falls along the inner side of the outer membrane 1 and the outer side of the inner membrane 2 to the bottom of the deodorizing bases 4 and is discharged from the deodorizing bases 4.

The outer membrane 1 using the air-proof and water-proof fabrics faces toward the outer space, so that the water vapor, malodor and condensate, as well as rain, cannot penetrate. Preferably, durable, UV-resistant and oxidation-resistant material is used.

The inner membrane 2 using the breathable but waterproof fabric faces toward the composting pile, so that the water vapor and malodor on the inner side can penetrate to the outer side while the condensate does not flow back to the inner side. Preferably, the material with a water vapor penetrability of higher than 3,000 g/(m$^2$·s) (measured at 23° C. according to ASTM E3983) is used, so that the water vapor can quickly leave the composting space to avoid the condensation on the inner side of the inner membrane 2 and can fall back to the compost. Preferably, antibacterial material is used to avoid the formation of biofilm and the blockage of membrane pores which would reduce air penetrability. Preferably, when the composting adopts the oxygen supply way of positive forced ventilation, material with an air penetration of higher than 15 L/(m$^2$·s) (tested at 10 mbar according to ISO9237) is to be used, so that the tail gas can be discharged timely.

Figure 2:
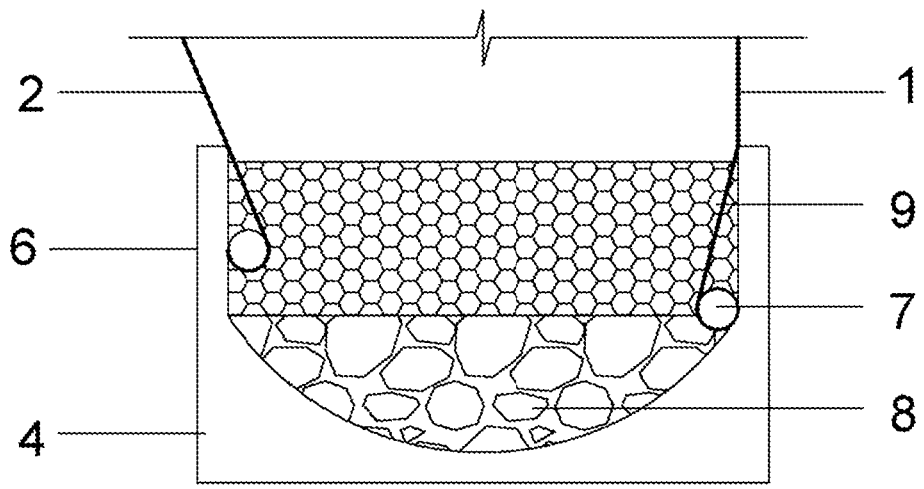
FIG. 2 is a vertical view of the details of the bases as shown in FIG. 1.

The deodorizing base 4 serve to fixate and seal the outer membrane and the inner membrane and to collect and treat the waste water. The deodorizing base 4, as shown in FIG. 2, comprises a slotted frame 6, with the ends of the outer membrane 1 and the inner membrane 2 both fixed to the inner side of the slotted frame 6 by means of a holder 7. A filler layer 9 is laid on the upper layer in the slotted frame 6 while a guide layer 8 is laid on the lower layer. The waste water between the outer membrane 1 and the inner membrane 2 first flows into the filler layer 9, and then flows into and is discharged from the guide layer 8. The filler layer 9 is used to adsorb, assimilate and degrade the malodor molecules dissolved in the condensed water; the filler layer 9 is also used to degrade the malodor molecules by way of biological action when a biofilm is formed on the filler surface in the filler layer 9. The guide layer 8 is used to collect and discharge the waste water.

The filler in the filler layer 9 is selected from bio-carbon particles or activated carbon particles; the lower surface of the guide layer 8 has a certain slope, and the guide layer 8 is provided with permeable material such as gravel.

Figure 4:
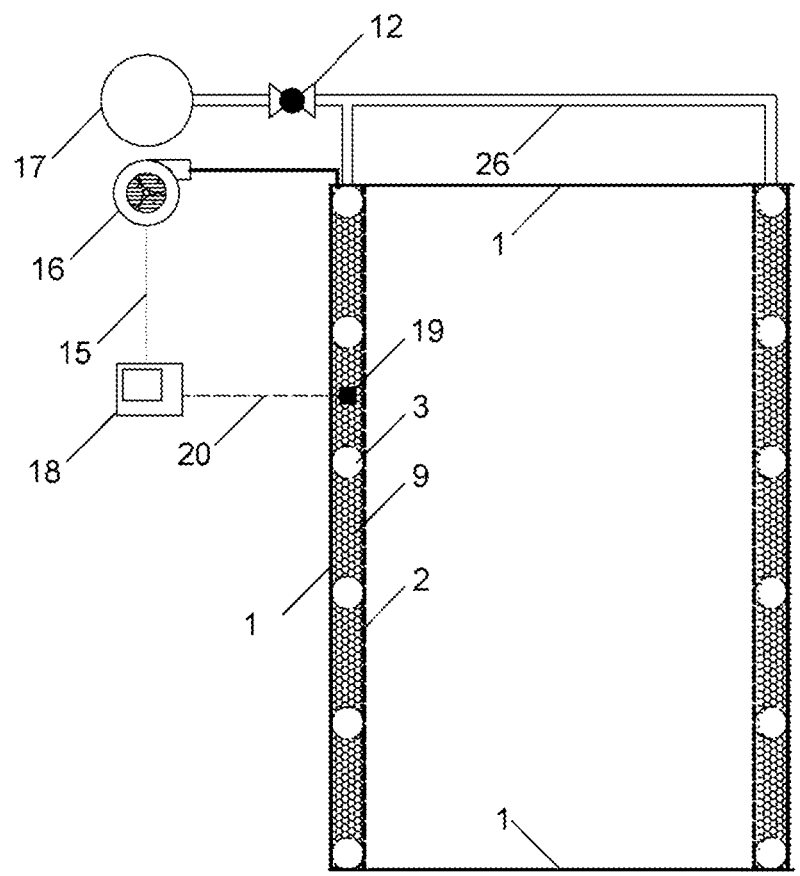
FIG. 4 is a diagram of the condensate collecting treatment and the air pressure control as shown in FIG. 1.

As shown in FIG. 4, the enhancement of the aerobic bio-degradation efficiency of the malodor molecules in the filler layer 9 can be realized by way of maintaining the oxygen content in the headspace of the filler layer 9 at a higher level so as to ensure that the microorganisms in the filler layer 9 are aerobic. Particularly, an oxygen sensor 19 is provided on the filler layer 9 to monitor the oxygen content in the space between the outer membrane 1 and the inner membrane 2, and the oxygen sensor 19 is transmitted to the oxygen controller 18 through the oxygen detection signal line 20; the oxygen controller 18 is connected to blower II 16 through an electrically controlled line 15, wherein when the oxygen content is lower than the set value, the oxygen controller 18 activates blower II 16 through the electronically controlled line 15 to supply the oxygen to the filler layer 9. Because the inner membrane 2 has a certain air penetrability, the oxygen will spread to the composting space, thus making the composting space (i.e., above the composting surface) also have a high oxygen content, which is also conducive to the degradation of the malodor molecules in the composting space. Preferably, the oxygen content is controlled to 10% (v/v).

For the deodorizing base 4, a water vapor collecting pipe 26 connected to the guide layer 8 is also provided; the water vapor collecting pipe 26 discharges the collected waste water and the tail gas directly, or externally connected with a water vapor control system 17 to improve the level of pollution control, so that the use of the water vapor control system 17 enables the further treatment and purification of the collected waste water and tail gas. The water vapor collecting pipe 26 discharges the waste water and the tail gas in the guide layer 8 when the electronically controlled valve 12 provided on the water vapor collecting pipe 26 is opened, and encloses the waste water and the tail gas in the treatment system when the electronically controlled valve 12 is closed, thus increasing the residence time of the malodor molecules during the period so as to improve the efficiency of malodor removal.

Figure 3:
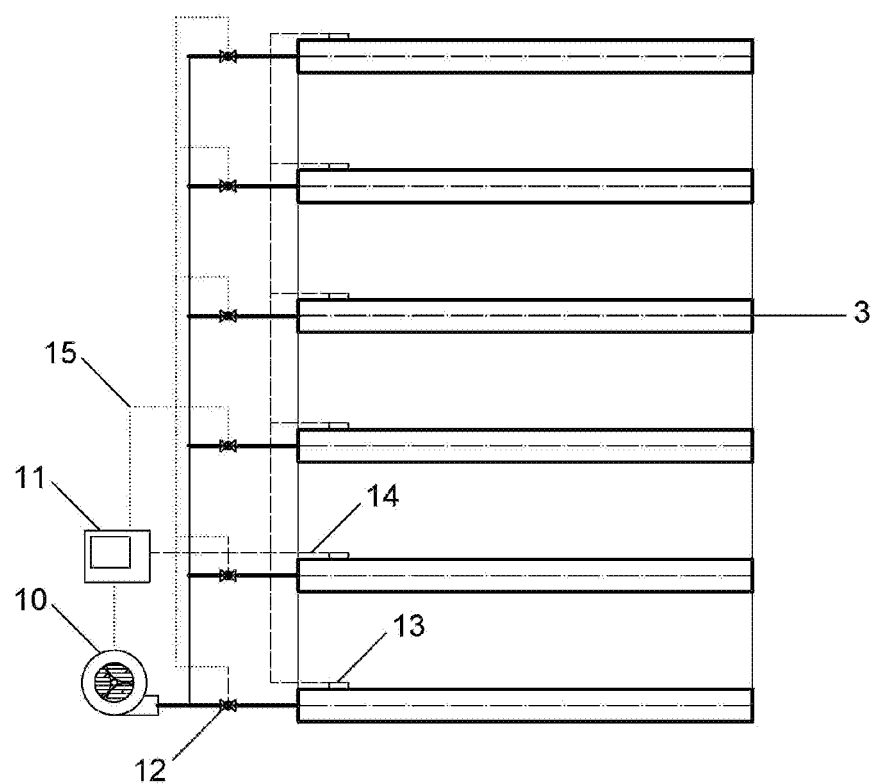
FIG. 3 is a planar view of the air-ribbed cage as shown in FIG. 1.

The air-ribbed cage 3 supporting and separating the outer membrane 1 and the inner membrane 2 is composed of a plurality of independent inflatable columns, as shown in FIG. 3, with each of the inflatable columns 3 being bent and both ends of each inflatable column located above the two deodorizing bases 4.

Each of the inflatable columns are provided with separate inflatable pipes and air pressure sensors 13, wherein the inflatable pipe is separately provided with an electrically controlled valve 12, and all of the inflatable pipes are connected to blower I 10; the air pressure sensor 13 is connected with the air pressure controller 11 through an air pressure detection signal line 14, and the air pressure controller 11 is respectively connected with each electrically controlled valve 12 and blower I 10 through the electrically controlled line 15; when the pressure of a certain inflatable column is reduced, the air pressure controller 11 activates blower I 10 and the electrically controlled valve 12 for a separate air supply. The use of the independent inflatable columns can avoid the destruction of the overall structure caused by local leakage, make maintenance and overhauling easier and save the cost of blowing.

The inflatable columns are connected to the outer membrane 1 and the inner membrane 2 through a fixing ring 5 for easy disassembly and assembly, and the outer membrane 1 and the inner membrane 2 can be independently removed and cleaned. The front and back of the composting space formed can be completed enclosed by the outer membrane 1, or a transparent window and large and small-sized door openings can be provided on the outer membrane 1 for occasional entry and exit of facilities, materials and personnel.

Embodiment 2

Figure 5:
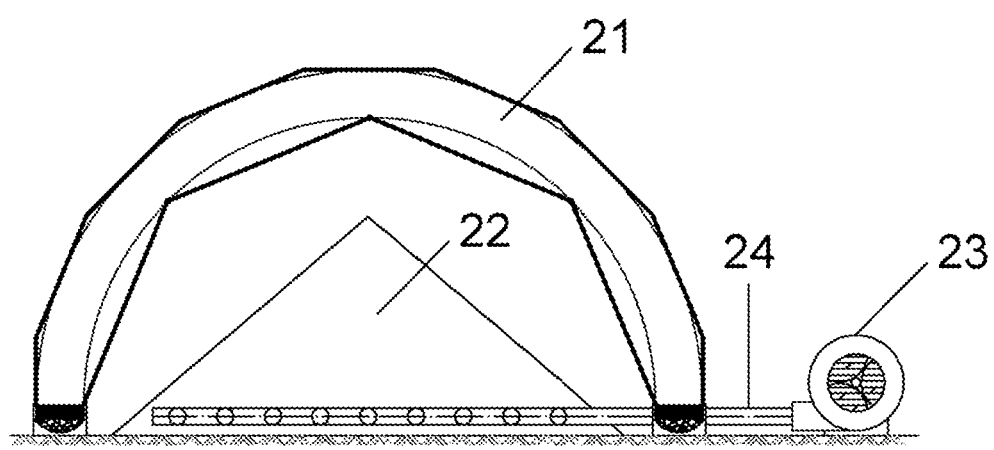
FIG. 5 is an operational diagram of the composting treatment via the positive forced ventilation in the present invention.

As shown in FIG. 5, the assembled device 21 in the present invention is applied to the primary fermentation stage of the composting process via positive pressure forced ventilation. Composting pile 22 is placed in the assembled device 21, and blower III 23 is placed externally and ventilates toward the inside of the assembled device 21 through a ventilating pipe 24. The water vapor and the malodor generated from the composting pile 22, as well as the tail gas formed upon the positive-pressure blowing over the compost, will all pass through the inner membrane 2 but can be completely blocked by the outer membrane 1, so that the formed waste water and the waste gas are treated via the bases 4. Therefore, the malodor cannot be sensed on the outer side of the outer membrane 1.

Embodiment 3

As shown in FIG. 5, the assembled device 21 in the present invention is applied to the secondary fermentation stage of the composting process. Since the content of organic matter in the biomass is low and the water content is reduced in the secondary fermentation stage, the demand for oxygen is reduced and blower III 23 can be closed. And blower II 16, as shown in FIG. 4 is directly used to supply the oxygen so as to maintain the oxygen content in the composting space of higher than 10% and accelerate the maturity of the composting pile 22.

Embodiment 4

Figure 6:
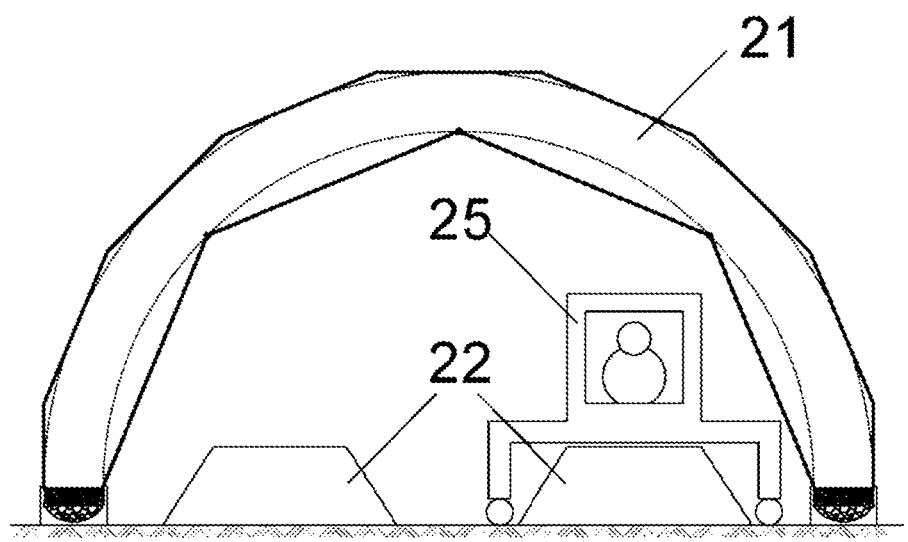
FIG. 6 is an operational diagram of the composting treatment via the turning machine in the present invention.

As shown in FIG. 6, the assembled device 21 in the present invention is applied to the composting process using a compost-turning method. In the operating process of the turning machine 25, blower II 16, as shown in FIG. 4, is used to supply the oxygen so as to maintain an oxygen content in the composting space of higher than 18%, to facilitate the operator's breathing. During the standing period, the oxygen content of the composting space is maintained greater than 10%, which reduces the level of malodor in the space.

The embodiments described above are intended to help those skilled in the art understand and use the invention. Obviously, those skilled in the art could easily make various amendments for these embodiments and apply the general principle described herein into other embodiments without any creative labor. Therefore, the above-mentioned embodiments are not intended to limit the present invention and any amendments and modifications made by those skilled in the art based on the disclosed invention without deviating from the scope of the invention shall be included in the protection scope of the present invention.

What is claimed is:

1. A self-deodorizing composting system, comprising an outer membrane; an inner membrane; an air-ribbed cage; a first deodorizing base; and a second deodorizing base,
    wherein the outer membrane and the inner membrane are held apart by the air-ribbed cage,
    a first end and a second end of the outer membrane and of the inner membrane are respectively fixed to the first and the second deodorizing bases,
    the outer membrane includes an air-proof and a water-proof fabric,
    the outer membrane is located on an outer side of the air-ribbed cage,
    the inner membrane includes a breathable but water-proof fabric,
    the inner membrane is located on an inner side of the air-ribbed cage,
    an inner side of the inner membrane faces and encloses a compost, and,
    a closed space is formed between the outer membrane and the inner membrane, and malodor and water vapor generated from the compost flow through the inner membrane into the closed space and then into the first and the second deodorizing bases and are discharged from the first and the second deodorizing bases.

2. The self-deodorizing composting system as claimed in claim 1,
    wherein the first and second deodorizing bases each comprises: a slotted frame; a filler layer laid on an upper portion of the slotted frame; and a guide layer laid on a lower portion of the slotted frame, wherein the lower portion is below the upper portion, the filler layer is capable of absorbing, assimilating, and degrading a molecule of the malodor dissolved in condensed water, and the guide layer is capable of collecting and discharging a waste water.

3. The self-deodorizing composting system as claimed in claim 2, wherein the filler layer is capable of degrading the molecule of the malodor by way of a biological action when a biofilm is formed on a surface of a filler in the filler layer.

4. The self-deodorizing composting system as claimed in claim 2, wherein a filler in the filler layer includes at least one selected from the group consisting of a bio-carbon particle and an activated carbon particle, a lower surface of the guide layer has a slope, and the guide layer includes a permeable material.

5. The self-deodorizing composting system as claimed in claim 4, wherein the permeable material is a gravel.

6. The self-deodorizing composting system as claimed in claim 2, wherein an oxygen sensor is provided on the filler layer to monitor an oxygen content in a space between the outer membrane and the inner membrane, and data from the oxygen sensor is transmitted to an oxygen controller through an oxygen detection signal line, the oxygen controller is in communication with a blower through an electrically controlled line, and when the oxygen content is lower than a set value, the oxygen controller initiates the blower through the electrically controlled line to supply oxygen to the filler layer.

7. The self-deodorizing composting system as claimed in claim 2, wherein a water-vapor collecting pipe is in fluid connection with the guide layer, the water-vapor collecting pipe collects and discharges the waste water and a waste gas, or the water-vapor collecting pipe is in fluid connection with an external water-vapor controller, and the external water-vapor controller treats and purifies the waste water and the waste gas.

8. The self-deodorizing composting system as claimed in claim 1, wherein the air-ribbed cage is composed of a plurality of independent inflatable columns, each of the inflatable columns is bent, and both ends of each of the inflatable columns are located above the first and second deodorizing bases.

9. The self-deodorizing composting system as claimed in claim 8, wherein each of the inflatable columns is provided with a separate inflatable pipe and an air pressure sensor, the inflatable pipes each are separately provided with an electrically controlled valve, and the inflatable pipes are connected to a blower, the air pressure sensor is in communication with an air pressure controller through an air pressure detection signal line, and the air pressure controller is in communication with the electrically controlled valve and the blower through an electrically controlled line, when a pressure of one of the inflatable columns is reduced, the air pressure controller activates the blower and the electrically controlled valve for a separate air supply.

10. The self-deodorizing composting system as claimed in claim 8, wherein each of the inflatable columns is connected to the outer membrane and the inner membrane via a fixing ring.

11. The self-deodorizing composting system as claimed in claim 1, the outer membrane is provided with a transparent window and door openings.

\* \* \* \* \*